United States Patent
Muthiah et al.

(10) Patent No.: US 11,683,258 B1
(45) Date of Patent: Jun. 20, 2023

(54) METHOD AND SYSTEM FOR OFF-LOADING STREAMS SELECTION TO GENERATE ORGANIZED CONCURRENT STREAMS IN SIMULATION ENVIRONMENT

(71) Applicant: HCL America Inc., Sunnyvale, CA (US)

(72) Inventors: Manickam Muthiah, Massachusetts, MA (US); Rohit Kumar, Massachusetts, MA (US); Shashank Nafde, Milpitas, CA (US); Razi Abdul Rahim, Willowbrook, IL (US)

(73) Assignee: HCL America Inc., Sunnyvale, CA (US)

( * ) Notice: Subject to any disclaimer, the term of this patent is extended or adjusted under 35 U.S.C. 154(b) by 0 days.

(21) Appl. No.: 17/748,071

(22) Filed: May 19, 2022

(51) Int. Cl.
  *G06F 13/00* (2006.01)
  *H04L 43/55* (2022.01)
  *H04L 43/0823* (2022.01)
  *H04L 65/80* (2022.01)

(52) U.S. Cl.
  CPC .......... *H04L 43/55* (2022.05); *H04L 43/0823* (2013.01); *H04L 65/80* (2013.01)

(58) Field of Classification Search
  CPC ...... H04L 43/55; H04L 43/0823; H04L 65/80
  USPC ................................. 709/236, 246, 231, 232
  See application file for complete search history.

(56) References Cited

U.S. PATENT DOCUMENTS

| | | | |
|---|---|---|---|
| 6,044,225 A | 3/2000 | Spencer et al. | |
| 7,926,062 B2 | 4/2011 | Nemirovsky et al. | |
| 10,116,724 B2 | 10/2018 | George et al. | |
| 10,996,267 B2 * | 5/2021 | Abraham | G01R 31/31725 |
| 2009/0241119 A1 * | 9/2009 | Nemirovsky | G06F 9/4818 718/107 |
| 2013/0166766 A1 | 6/2013 | Nahrstedt et al. | |
| 2016/0294915 A1 * | 10/2016 | George | H04L 43/16 |
| 2020/0233031 A1 * | 7/2020 | Abraham | G01R 31/31715 |

FOREIGN PATENT DOCUMENTS

CN 107079013 A 8/2017

* cited by examiner

*Primary Examiner* — Kenneth R Coulter (57) ABSTRACT

A method for off-loading streams selection to generate organized concurrent streams in a simulation environment is disclosed. In some embodiments, the method includes receiving at least one stream selection request for a DUT from a DUT input generator; performing a stream selection process in response to receiving the request. In order to perform the stream selection process, the method includes analyzing each of a plurality of stream specification entries of a stream specification entries array; selecting a stream from the plurality of streams based on one or more of the set of stream specification entry fields associated with the stream; and generating a stream selection result object based on the selected stream; sending the stream selection result object associated with the selected stream to a respective DUT input generator; and utilizing, by the respective DUT input generator, the stream selection result object associated with the selected stream.

17 Claims, 7 Drawing Sheets

FIG. 1

| Stream Specification Entry 202A |
|---|
| Stream Enable |
| Stream ID |
| Sub-Stream IDs Spec |
| Input Stream Rate Spec (Used in Mode 1) |
| Output Stream Rate Spec (Used in Mode 2) |
| Input Packet Size Spec |
| Output Packet Size Spec (Used in Mode 2) |
| Packet Type Spec |
| Total Number of Packets Spec |
| Error Injection Spec |
| Sync Interval Spec |
| Mode Spec (Mode 1/Mode 2) |
| Entry Last Updated Time |
| Accumulated Credit (real data type - expresses the accumulated number of bytes for the corresponding rate) |
| Packets Count (Number of packets sent already for the stream) |
| Stop/Re-Start Enable |
| Packets Before Stop Spec |
| Delay Before Re-Start Spec |
| Stopped Time (Timestamp indicating when the Stream stopped) |

| Sub-parameters 202B |
|---|
| Enable specification |
| Range specification |
| Minimum value for range |
| Maximum value for range |
| Discrete value specification |
| Discrete values |

| Sub-Stream IDs Spec 202C | |
|---|---|
| Sub-parameters 204C | Values 206C |
| Enable specification | 1 |
| Range specification | 0 |
| Minimum value for range | 0 |
| Maximum value for range | 0 |
| Discrete value specification | 1 |
| Discrete values | 5, 10, 12, 15, 18, 21, 25 |

| Input Packet Size Spec 202D | |
|---|---|
| Sub-parameters 204D | Values 206D |
| Enable specification | 1 |
| Range specification | 1 |
| Minimum value for range | 1 |
| Maximum value for range | 20 |
| Discrete value specification | 0 |
| Discrete values | 0 |

METHOD AND SYSTEM FOR OFF-LOADING STREAMS SELECTION TO GENERATE ORGANIZED CONCURRENT STREAMS IN SIMULATION ENVIRONMENT

TECHNICAL FIELD

Generally, the invention relates to concurrent streams generation. More specifically, the invention relates to method and system for off-loading streams selection to generate organized concurrent streams in a pre-silicon simulation environment.

BACKGROUND

Currently, one of a possible way for injecting several streams with different characteristics is via a Universal Verification Methodology (UVM) sequence. The UVM is a standard that enables the industry to produce and reuse verification environments and verification IP (VIP) more quickly. Moreover, the UVM sequence can be defined as a sequence that is made up of a variety of data elements that may be combined in different ways to generate unique scenarios. Further, execution of the UVM sequence is done using an assigned sequencer which then sends data elements to the driver. Hence, for any verification environment, sequences can be considered as a core stimulus.

However, in a scenario where there are several streams or channels of data are available that needs to be injected via a single Device Under Test (DUT) input interface or System Under Test (SUT) input interface, production of data might become complicated, especially when each stream of data has different characteristics. In such scenario, using the currently existing technique, i.e., the UVM, one possible approach to achieve this is have multiple sequences (one per Stream or Channel) and a single sequencer that arbitrates between them and feeds the input packets from the sequences to the driver. Moreover, when there are large number of streams or channels, then managing of the sequences might become challenging with currently existing technique (i.e., UVM sequence). Furthermore, via the UVM sequence, the implementation might become cumbersome, if there are numerous DUT or SUT input interfaces available and each have its own set of streams or channels.

Therefore, there is a need of implementing an efficient and reliable technique for off-loading streams selection to generate organized concurrent streams in a simulation environment.

SUMMARY OF INVENTION

In one embodiment, a method for off-loading streams selection to generate organized concurrent streams in a simulation environment is disclosed. The method may include receiving from at least one Device Under Test (DUT) input generator, at least one stream selection request for a DUT. The method may include performing a stream selection process in response to receiving the request. The method for performing the stream selection process further includes analyzing each of a plurality of stream specification entries of a stream specification entries array. It should be noted that, each of the plurality of stream specification entries includes a set of stream specification entry fields associated with each of a plurality of streams. In addition, the method for performing the stream selection process further includes selecting a stream from the plurality of streams based on one or more of the set of stream specification entry fields associated with the stream. Moreover, the method for performing the stream selection process further includes generating a stream selection result object based on the selected stream. It should be noted that, the stream selection result object includes a subset of characteristics corresponding to a subset of stream specification entry fields of the selected stream. The method further includes sending the stream selection result object associated with the selected stream to a respective DUT input generator from the at least one DUT input generator in response to receiving the request. The method further includes utilizing the stream selection result object associated with the selected stream to send one or more packets to the DUT for the selected stream.

In another embodiment, a system for off-loading streams selection to generate organized concurrent streams in a simulation environment is disclosed. The system includes a processor and a memory communicatively coupled to the processor. The memory may store processor-executable instructions, which, on execution, may cause the processor to receive from at least one Device Under Test (DUT) input generator, at least one stream selection request for a DUT. The processor-executable instructions, on execution, may further cause the processor to perform a stream selection process in response to receiving the request. In addition, to perform the stream selection process, the processor executable instruction further causes the processor to analyze each of a plurality of stream specification entries of a stream specification entries array. It should be noted that, each of the plurality of stream specification entries includes a set of stream specification entry fields associated with each of a plurality of streams. Further, to perform the stream selection process, the processor executable instruction further causes the processor to select a stream from the plurality of streams based on one or more of the set of stream specification entry fields associated with the stream. Moreover, to perform the stream selection process, the processor executable instruction further causes the processor to generate a stream selection result object based on the selected stream. It should be noted that, the stream selection result object includes a subset of characteristics corresponding to a subset of stream specification entry fields of the selected stream. The processor-executable instructions, on execution, may further cause the processor to send the stream selection result object associated with the selected stream to a respective DUT input generator from the at least one DUT input generator in response to receiving the request. The processor-executable instructions, on execution, may further cause the processor to utilize the stream selection result object associated with the selected stream by the respective DUT input generator, to send one or more packets to the DUT for the selected stream.

In yet another embodiment, a non-transitory computer-readable medium storing computer-executable instruction for off-loading streams selection to generate organized concurrent streams in a simulation environment is disclosed. The stored instructions, when executed by a processor, may cause the processor to perform operations including receiving from at least one Device Under Test (DUT) input generator, at least one stream selection request for a DUT. The operations may further include performing a stream selection process in response to receiving the request. The operations for performing the stream selection process may include analyzing each of a plurality of stream specification entries of a stream specification entries array. It should be noted that, each of the plurality of stream specification entries includes a set of stream specification entry fields associated with each of a plurality of streams. Further, the operations for performing the stream selection process may include selecting a stream from the plurality of streams based on one or more of the set of stream specification entry fields associated with the stream. In addition, the operations for performing the stream selection process may include generating a stream selection result object based on the selected stream. It should be noted that, the stream selection result object includes a subset of characteristics corresponding to a subset of stream specification entry fields of the selected stream. The operations may further include sending the stream selection result object associated with the selected stream to a respective DUT input generator from the at least one DUT input generator in response to receiving the request. The operations may further include utilizing, by the respective DUT input generator, the stream selection result object associated with the selected stream to send one or more packets to the DUT for the selected stream.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
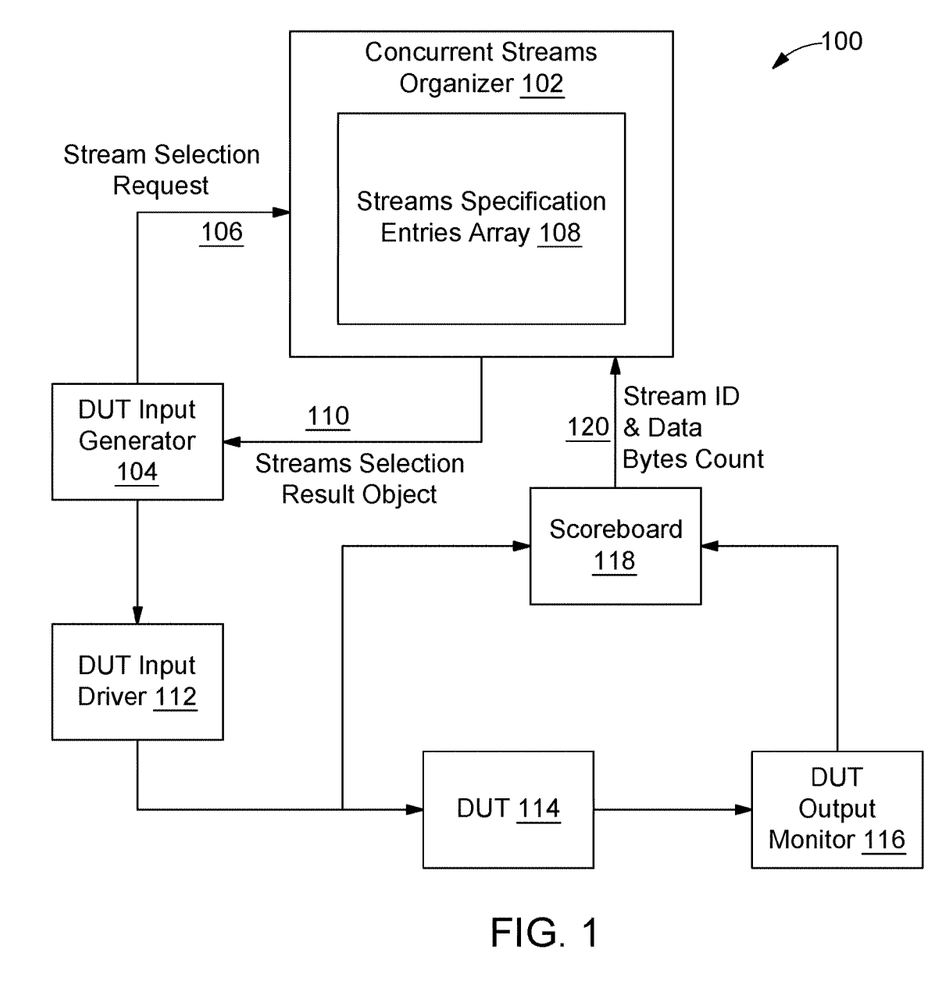
FIG. 1 illustrates a functional diagram of a system configured for off-loading streams selection to generate organized concurrent streams in a simulation environment, in accordance with an embodiment.

A functional diagram of a system 100 configured for off-loading streams selection to generate organized concurrent streams in a simulation environment is illustrated in FIG. 1, in accordance with an embodiment. In order to off-load streams selection to generate organized concurrent streams, the system 100 may include a concurrent streams organizer 102. The concurrent streams organizer 102 may be configured to receive at least one stream selection request 106 from a Device Under Test (DUT) input generator 104. In an embodiment, the at least one stream selection request 106 may be received for a DUT 114. Upon receiving the request, the concurrent streams organizer 102 may be configured to perform a stream selection process.

In an embodiment, the stream selection process may be performed based on one of an input stream rate and an output stream rate associated with the stream. Moreover, the stream selection process may be performed in at least one of a normal selection mode and an expected output-based selection mode. Further, the expected output-based selection mode may be useful when focus is on the output stream rates, and the input stream rate and the output stream rate are different for the selected stream. For example, the output stream rate may be greater than corresponding input stream rate due to data addition by the DUT 114. A technique used for performing stream selection process using the normal selection mode and the expected output-based selection mode, has been explained in detail in conjunction with FIG. 6.

Figure 2A:
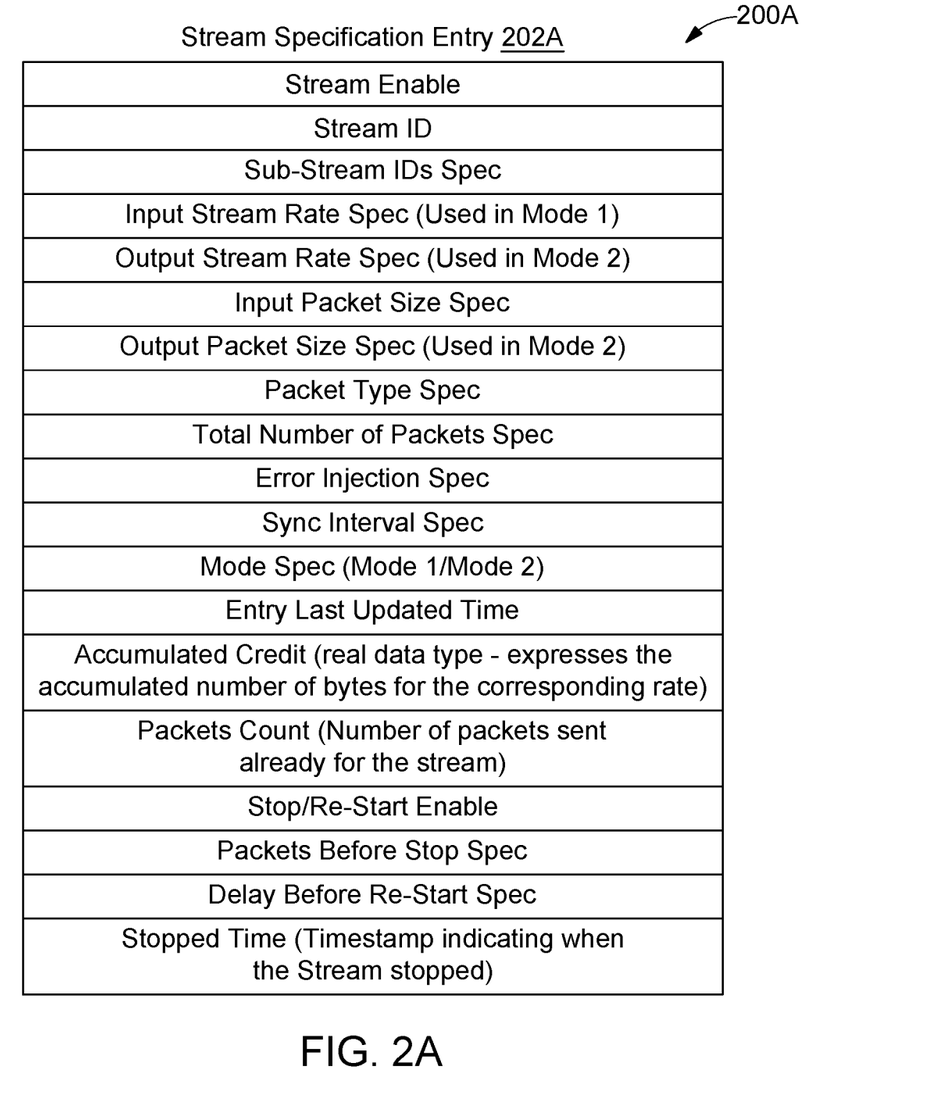
FIGS. 2A-2D represent tables depicting each of a plurality of stream specification entries of a stream specification entries array, in accordance with some exemplary embodiment.

In order to perform the stream selection process, the concurrent streams organizer 102 may analyze each of a plurality of stream specification entries of a stream specification entries array 108. In an embodiment, each of the plurality of stream specification entries may include a set of stream specification entry fields associated with each of a plurality of streams. The set of stream specification entry fields associated with each of the plurality of streams has been described in detail in conjunction with FIG. 2. Based on analysis of each of the plurality of stream specification entries, the concurrent streams organizer 102 may select a stream from the plurality of streams. The selection of the stream may be done based on one or more of the set of stream specification entry fields associated with the stream.

Once the selection of the stream is performed, the concurrent streams organizer 102 may generate a stream selection result object 110 based on the selected stream. In an embodiment, the concurrent streams organizer 102 may maintain an array of the stream selection result object 110. The maintained array of the stream selection result object may be used for generating input packets summary report for each of the selected streams at end of testing. In an embodiment, the stream selection result object 110 may include a subset of characteristics corresponding to a subset of stream specification entry fields of the selected stream. The subset of characteristics of the selected stream may include, but is not limited to, a Stream ID (Stream Identifier), a Sub-Stream ID, an Input Packet Size, a Packet Type, a Packet Number, a Sync Packet, and an Inject Error. This has been further explained in detail in conjunction to FIGS. 3A-3B.

Once the stream selection result object 110 is generated, the concurrent streams organizer 102 may send the stream selection result object 110 associated with the selected stream to a respective DUT input generator, i.e., the DUT input generator 104. Upon receiving the stream selection result object 110 associated with the selected stream, the DUT input generator 104 may utilize the one or more of the set of stream specification entry fields from the stream selection result object to send one or more packets to the DUT 114 for the selected stream. In an embodiment, the DUT input generator 104 may generate the one or more packets based on the subset of characteristics of the selected stream. In order to send the one or more packets to the DUT 114, initially, the DUT input generator 104 may send the one or more packets generated to a DUT input driver 112. In an embodiment, the DUT input driver may correspond to a DUT input interface.

Upon receiving the one or more packets, the DUT input driver 112 may inject the one or more packets into the DUT 114. Moreover, a DUT output monitor 116 may be configured to monitor an output interface of the DUT 114. The information associated with the stream selection result object 110 may include stream identification (ID) 120 of the selected stream. In an embodiment, the scoreboard 118 may also be referred as a testbench prediction block or checker. Moreover, the DUT output monitor 116 may provide information associated with one or more output packets at the output interface of the DUT 114 to the scoreboard 118. It should be noted that, the one or more output packets may be different than the one or more packets injected by the DUT input driver 112 into the DUT 114.

Further, the scoreboard 118 may send the Stream ID and Data Bytes Count 120 associated with each of the expected DUT 114 output packets to the concurrent streams organizer 102. The concurrent streams organizer 102 may then update the stream specification entries array 108 based on the information received for the selected stream. In an embodiment, the updated stream specification entries array may be used for performing subsequent stream selection for the DUT input generator 104 based on a subsequent request received from the DUT input generator 104.

Referring now to FIGS. 2A-2D, tables depicting a plurality of stream specification entries present in a stream specification entries array are represented, in accordance with some exemplary embodiment. In FIG. 2A, the stream specification entry 202A is depicted via a table 200A. In an embodiment, the plurality of stream specification entries may include a set of stream specification entry fields associated with each of a plurality of streams. Moreover, each of the set of stream specification entry fields may specify parameters of each of the plurality of streams.

In the table 200A, each row of the table 200A may represent one of the set of stream specification entry fields. As depicted via present FIG. 2A, the set of stream specification entry fields may include stream enable, stream identifier (ID), sub-stream identifiers (IDs) specification, input stream rate specification, output stream rate specification, input packet size specification, output packet size specification, packet type specification, total number of packets specification, error injection specification, sync interval specification, mode specification, entry last updated time, accumulated credit (i.e., real data type that may express accumulated number of bytes for the corresponding rate), packets count (i.e., number of packets sent already for the stream), stop or re-start enable, packets before stop specification, delay before re-start specification, stopped time (i.e., timestamp indicating when the stream stopped). In an embodiment, each of the set of stream specification entry fields may be customized or enhanced based on project requirements.

It should be noted that, the input stream rate specification entry field from the set of stream specification entry fields may only be used in the normal selection mode opted for performing the stream selection process. Moreover, the output stream rate specification and the output packet size specification may only be used in the expected output-based selection mode opted for performing the stream selection process. In an embodiment, each of the set of stream specification entry fields of each of the plurality of streams may be analyzed to select the stream from the plurality of streams.

Figure 2B:
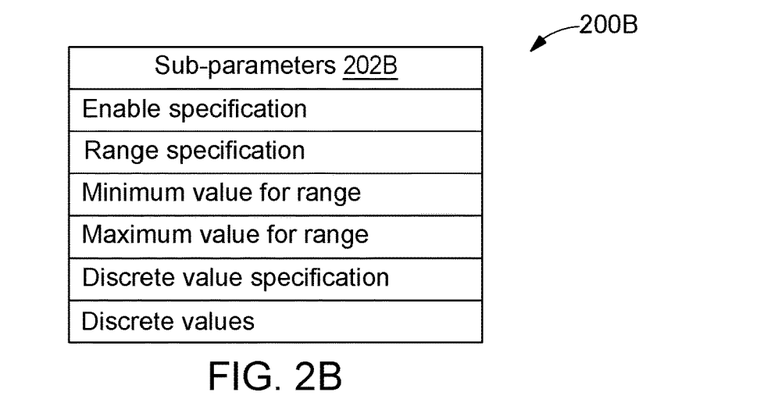

In an embodiment, each of the set of stream specification entry fields may also include a set of sub-parameters 202B, as depicted via a table 200B of FIG. 2B. As will be appreciated, each of the set of sub-parameters 202B may be customized or enhanced based on requirements of project. In an embodiment, the set of sub-parameters 202B may include enable specification, range specification, minimum value for range, maximum value for range, discrete value specification, and discrete values (also referred as discrete values dynamic array). It should be noted that, for fixed value, just one element may be used. By way of an example, when there is only one value to be used for a stream specification entry field, then the number of discrete values specified may be '1'. Thus, the value used may become a fixed value. Further, when there are multiple discrete values specified, then, one of the multiple discrete values may be used for a respective stream specification entry field. Moreover, when there is only one discrete value specified for a stream specification entry field, then the value to be used for the respective specification entry field may be a fixed value and equal to the discrete value specified.

Figure 2C:
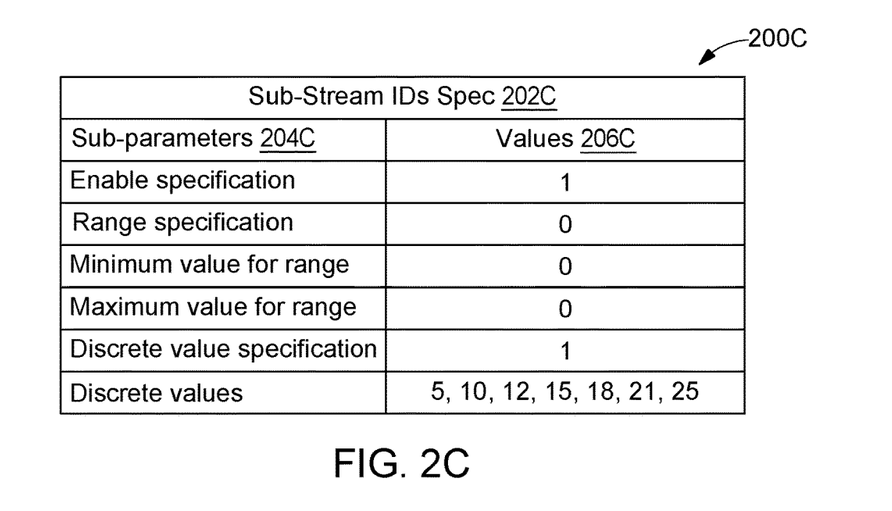

In FIG. 2C, the set of sub-parameters associated with third stream specification entry field, i.e., the sub-stream IDs specification is depicted via a table 200C. In the present FIG. 2C, the sub-stream IDs specification may correspond a sub-stream IDs specification (spec) 202C. In the table 200C, each row of first column, i.e., sub-parameters 204C for the sub-stream IDs specification 202C may depict each of the set of sub-parameters associated with the respective stream specification entry field. Further, each row of second column, i.e., values 206C, may depict a value for each of the set of sub-parameters associated with the sub-stream IDs specification 202A for each of the plurality of streams.

By way of an example, for first row, i.e., enable specification may depict whether sub-stream IDs are available for the respective stream. In an embodiment, when sub-stream IDs are available for the respective stream, then for that particular stream the enable specification may be set to '1', otherwise the enable specification may be set to '0'. A second row, i.e., range specification may be set to '0' when the sub-stream IDs cannot use a range of values. Further, the range specification may be set to '1' when the sub-stream IDs can use a range of values. A third row, i.e., minimum value for range may depict minimum value for each of the sub-stream IDs.

Further, fourth row, i.e., maximum value for range may depict maximum value for each of the sub-stream IDs. As depicted in the present FIG. 2C, the range specification, the minimum value for range, and the maximum value for range are set to '0' indicating that the sub-stream IDs cannot use a range of values. Further, fifth row, i.e., discrete value specification may depict whether the sub-stream IDs can have discrete values. As depicted in the present FIG. 2C, the discrete value specification for the sub-stream IDs is '1' indicating that the sub-stream IDs can use discrete values. Further, sixth row, i.e., discrete values (i.e., discrete value dynamic array) may depict an array of certain values that each of the sub-stream IDs may use. As depicted in the present FIG. 2C, the discrete value for each of the sub-stream IDs of the stream may be '5, 10, 12, 15, 18, 21, 25'.

Figure 2D:
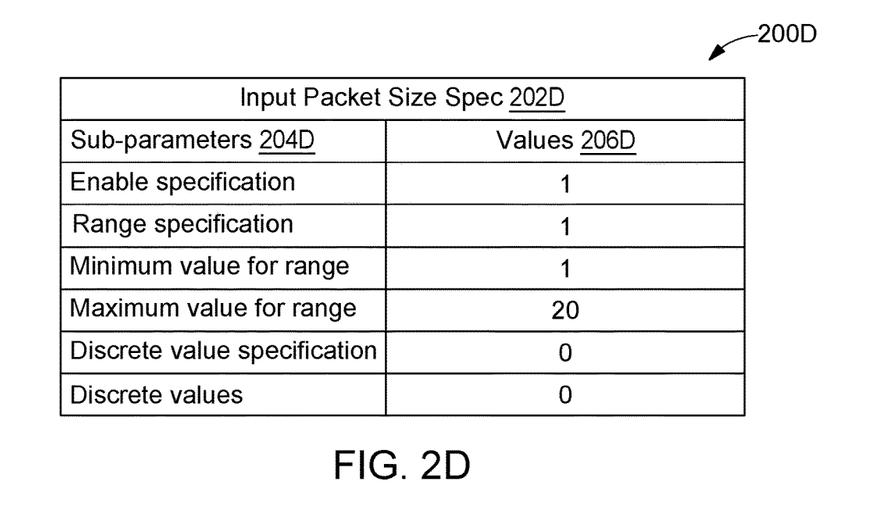

In FIG. 2D, the set of sub-parameters associated with fourth stream specification entry field, i.e., the input size packet specification is depicted via a table 200D. In the present FIG. 2D, the input size packet specification may correspond an input size packet specification (spec) 202D. As explained above in FIG. 2C, each row of the table 200D may depict each of the set of sub-parameters associated with the fourth-stream specification entry field. In table 200D, first column may depict the set of sub-parameters associated with the input size packet specification 202D, as sub-parameters 204D. Further, second column may depict values 206D for each of the set of sub-parameters associated with the input size packet specification 202D. As will be appreciated, for ease of explanation, the analysis performed for two stream specification entry fields for one stream has been explained. However, the analysis may be performed for each of the stream specification entry fields of each of the plurality of streams.

Figure 3A:
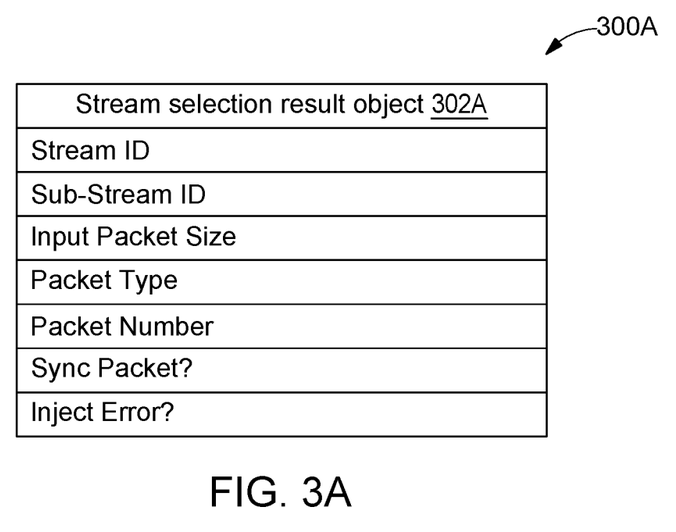
FIGS. 3A-3B represent tables depicting a stream selection result object generated based on a selected stream, in accordance with some exemplary embodiment.
Figure 3B:
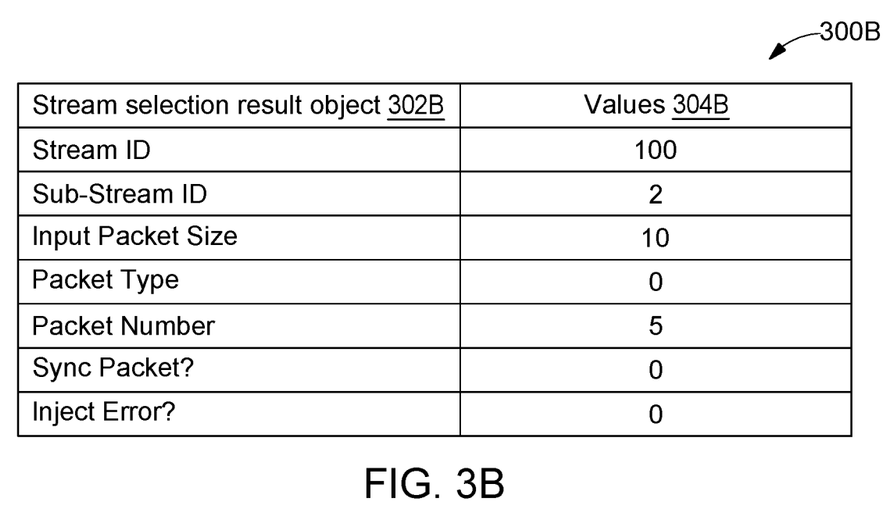

Referring now to FIGS. 3A-3B, tables depicting a stream selection result object 302A generated based on a selected stream is represented, in accordance with some exemplary embodiment. As depicted via a table 300A of FIG. 3A, the stream selection result object 302A may include the subset of characteristics corresponding to the subset of stream specification entry fields of the selected stream. In the table 300A, each row of the table 300A may depict each of the subset of characteristics. The subset of characteristics as depicted via each row of the table 300A may include a Stream ID (Stream Identifier), a Sub-Stream ID, an Input Packet Size, a Packet Type, a Packet Number, a Sync Packet, and an Inject Error. In an embodiment, each of the subset of characteristics may be customized or enhanced based on requirements of different projects. An example of the subset of characteristics corresponding to the subset of stream specification entry fields of the selected stream is depicted via a table 300B.

In table 300B, first column depicts each field of a stream selection result object 302B. A second column depicts a value 304B associated with each field of the stream selection result object 302B. In the table 300B, each row of the first column may depict the subset of characteristics corresponding to the subset of stream specification entry fields of the selected stream. A first row of the first column may depict first characteristic, i.e., the stream ID of the selected stream. Further, first row of the second column may depict the value associated with the first characteristic, i.e., the stream ID to be '100'. A second row of the first column may depict second characteristic, i.e., the sub-stream ID of the sub-stream available in the selected stream. Further, second row of the second column may depict the value associated with the second characteristic, i.e., the sub-stream ID to be '2'. A third row of the first column may depict third characteristic, i.e., the input packet size representing number of bytes that an input packet contains. Further, third row of the second column may depict the value associated with the third characteristic, i.e., the input packet size to be '10'.

A fourth row of the first column may depict fourth characteristic, i.e., packet type representing type of the input packet. Further, fourth row of the second column may depict the value associated with the fourth characteristic, i.e., the packet type to be '0'. A fifth row of the first column may depict fifth characteristic, i.e., packet number representing number of the input packet that needs to be injected to a DUT. In reference to FIG. 1, the DUT may correspond to the DUT 114. Further, fifth row of the second column may depict the value associated with the fifth characteristic, i.e., the packet number to be '5'. By way of an example, when for the selected stream, a first packet is being transmitted, then the packet number for the first packet may be '0'. Similarly, when for the selected stream, a second packet is being transmitted, then the packet number for the second packet may be '1'. As will be appreciated the packet number may keep on increasing based on number of packets that may have been already transmitted for the selected stream.

A sixth row of the first column may depict sixth characteristic, i.e., the sync packet. The sync packet may represent whether the input packet being shared is a synchronization packet for the selected stream. Further, sixth row of the second column may depict the value associated with the sixth characteristic, i.e., the sync packet to be '0'. In an embodiment, the sync packet '0' may represent that the input packet being shared is not the synchronization packet. A seventh row of the first column may depict seventh characteristic, i.e., the inject error. The inject error may depict whether an error has been inserted in the input packet shared. This is done to identify how the DUT 114 behaves in an abnormal condition. Further, seventh row of the second column may depict the value associated with the seventh characteristic, i.e., the inject error to be '0'. In an embodiment, the inject error '0' may represent that no error has been inserted in the input packet shared.

Figure 4:
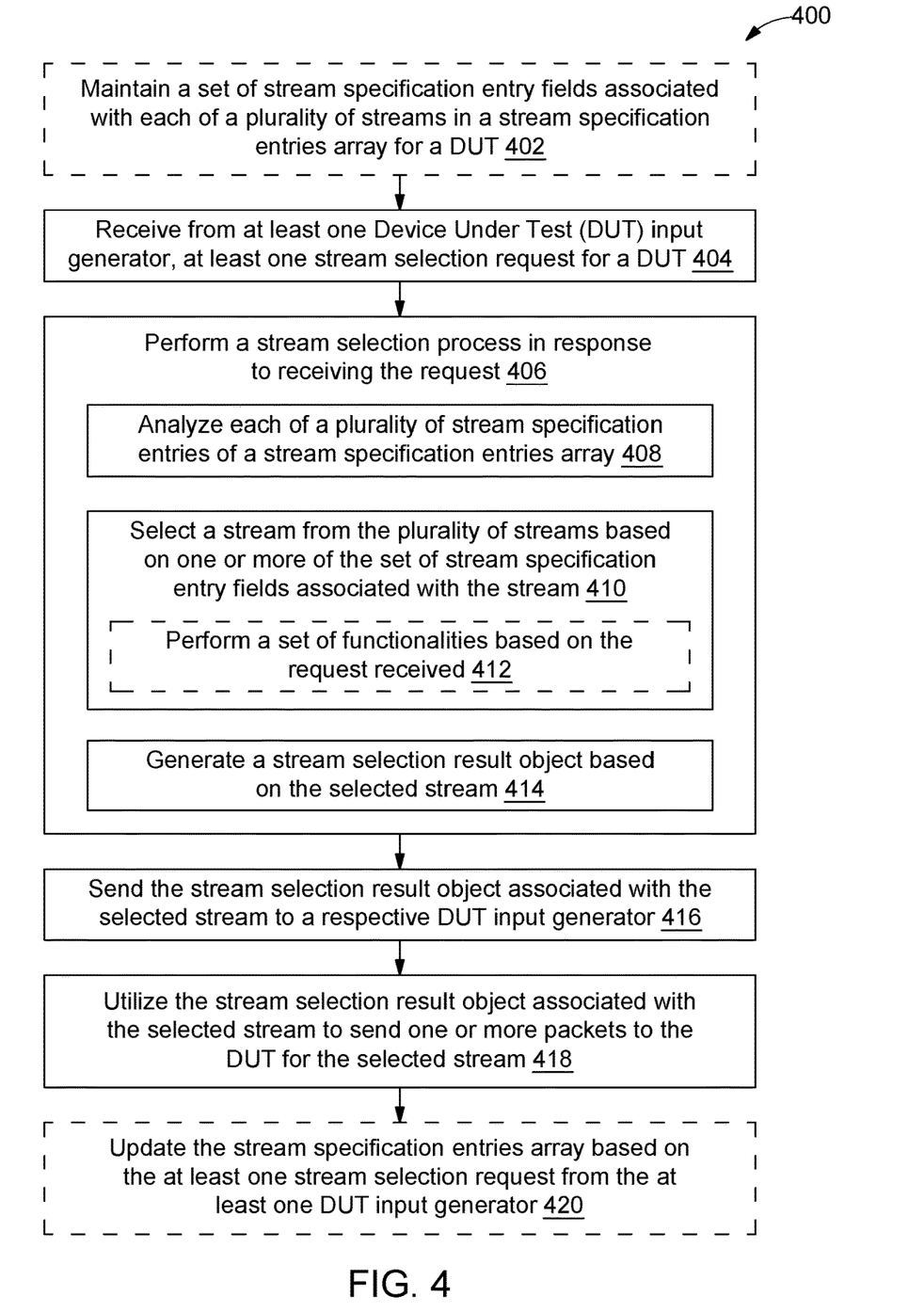
FIG. 4 illustrates a flowchart of a method for off-loading streams selection to generate organized concurrent streams in a simulation environment, in accordance with an embodiment.

Referring now to FIG. 4, a flowchart of a method 400 for off-loading streams selection to generate organized concurrent streams in a simulation environment is illustrated, in accordance with an embodiment. At step 402, a set of stream specification entry fields associated with each of a plurality of streams may be maintained in a stream specification entries array for a DUT. In reference to FIG. 1, the DUT may correspond to the DUT 114. Further, in reference to FIG. 2A, each row of the table 200A represents one of the set of stream specification entry fields. In an embodiment, a plurality of DUT input generators may be available for the DUT. Moreover, each of the set of stream specification entry fields in the plurality of stream specification entries array may specify a characteristic associated with each of the plurality of streams.

In an embodiment, in order to maintain the stream specification entries array, the DUT input generator (for example: UVM sequence) present in the simulation environment may be configured to generate a stream specification entry for each of the plurality of streams based on number of streams that can be used for a DUT input interface. In reference to FIG. 1, the DUT input generator may correspond to the DUT input generator 104. In addition, the DUT input interface may correspond to the interface that the DUT input driver 112 would use to inject DUT input packets. Further, the stream specification entry generated for each stream may include stream ID (Identifier), entry last update time set to current time, total number of packets specifications set to number of packets to be generated for each stream and stream enable set to '1'. Once a stream specification entry is generated for each of the plurality of streams, then, the generated stream specification entry may be added to the stream specification entries array in the concurrent streams organizer 102.

At step 404, at least one stream selection request may be received from at least one DUT input generator, for the DUT. In reference to FIG. 1, the at least one DUT input generator may correspond to the DUT input generator 104. Upon receiving the at least one stream selection request, at step 406, a stream selection process may be performed in response to receiving the request. In order to perform the stream selection process, at step 408, each of a plurality of stream specification entries of the stream specification entries array may be analyzed. In an embodiment, each of the plurality of stream specification entries may include a set of stream specification entry fields associated with each of the plurality of streams. Based on analysis of each of the plurality of stream specification entries, at step 410, a stream from the plurality of streams may be selected based on one or more of the set of stream specification entry fields associated with the stream.

In an embodiment, in order to perform the selection of the stream, each of the stream specification entries associated with each of the plurality of streams may be analyzed to identify one or more of the plurality of streams that fulfills pre-defined stream selection conditions. Moreover, the selection of the stream may be based on one of an input stream rate and an output stream rate associated with the stream through at least one of a normal selection mode and an expected output-based selection mode. A process of selecting the stream using the normal selection mode and the expected output-based selection mode has been explained in greater detail in reference to FIG. 6.

Moreover, in order to select the stream from the plurality of streams, at step 412, a set of functionalities may be performed based on the request received to provide the stream selection result object to the respective DUT input generator. In an embodiment, the set of functionalities performed may include a check to identify one or more of the plurality of streams present in the stream specification entries array that fulfills a first pre-defined condition. The first pre-defined condition may include identification of one or more of the plurality of streams for which the packets count is equal to the total number of packets specification. Based on the check performed, stream enable may be set to '0' in the respective stream specification entry in the stream specification entries array for one or more of the plurality of streams that fulfills the first pre-defined condition.

Moreover, based on the check performed, upon identifying that none of the plurality of stream fulfills the first predefined condition, then a notification may be sent to the at least one DUT input generator. The notification may include the stream selection result object indicating no availability of streams for sending the one or more packets to the DUT. Further, the set of functionalities may include a check performed to identify one or more of the plurality of streams present in the stream specification entries array that fulfills a second pre-defined condition. The second pre-defined condition may include identification of one or more of the plurality of streams with the stream enable set to '1', stop or re-start stream enable set to '1', and the packets count is equal to packets before stop specification for each of the one or more of the plurality of streams.

Based on the check performed, the stream enable may be set to '0' in the respective stream specification entry in the stream specification entries array for the one or more of the plurality of streams that fulfills the second pre-defined condition. Further, for each of the one or more of the plurality of streams identified based on the second pre-defined condition, the stopped time may be set to the current time in the respective stream specification entry in the stream specification entries array. The stopped time may indicate a timestamp of stopping of each of the one or more of the plurality of streams.

Further, the set of functionalities may include a check performed to identify one or more of the plurality of streams present in the stream specification entries array that fulfills a third pre-defined condition. The third pre-defined condition may include identification of one or more of the plurality of streams with stream enable set to '0', stop or re-start enable set to '1', and the current time to be greater than addition of the stopped time and delay before re-start specification. Based on the check performed, entry last updated time may be replaced with the current time in the respective stream specification entry in the stream specification entries array for each of the one or more of the plurality of streams that fulfills the third pre-defined condition. Further, an accumulated credit may be set to '0' and stream enable may be set to '1' in the respective stream specification entry in the stream specification entries array, i.e., re-starting stream, of each of the one or more of the plurality of streams that fulfills the third pre-defined condition.

Based on the set of functionalities performed, at step 414, a stream selection result object may be generated based on the selected stream. The stream selection result object generated may include a subset of characteristics corresponding to a subset of stream specification entry fields of the selected stream. In an embodiment, the subset of characteristics may include, but is not limited to, a Stream ID (Stream Identifier), a Sub-Stream ID, an Input Packet Size, a Packet Type, a Packet Number, a Sync Packet, and an Inject Error. Once the stream selection result object is generated, at step 416, the generated stream selection result object associated with the selected stream may be send to a respective DUT input generator from the at least one DUT input generator in response to receiving the request. It should be noted that, the respective DUT input generator may be the DUT input generator from which the at least one stream selection request is received.

Upon receiving the stream selection result object, at step 418, the respective DUT input generator may utilize the stream selection result object associated with the selected stream to send one or more packets to the DUT for the selected stream. Further, at step 420, the stream specification entries array may be updated based on the at least one stream selection request from the at least one DUT input generator. In an embodiment, the updated stream specification entries array may be used for performing subsequent stream selection for the at least one DUT input generator based on a subsequent request received from the at least one DUT input generator.

Figure 5:
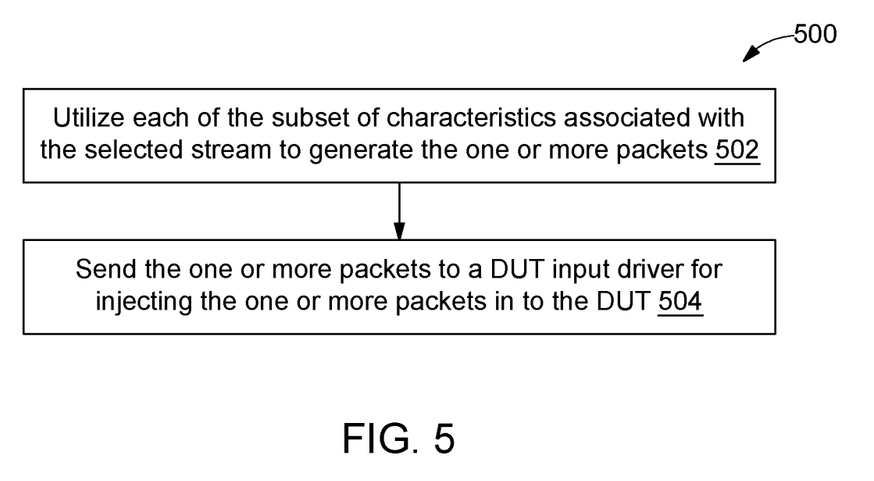
FIG. 5 illustrates a flowchart of a method for injecting one or more packets into a DUT based on the streams selection result object, in accordance with an embodiment.

Referring now to FIG. 5, a flowchart of a method for injecting one or more packets into a DUT based on the stream selection result object is illustrated, in accordance with an embodiment. In reference to FIG. 1, the DUT may correspond to the DUT 114. At step 502, the respective DUT input generator may utilize each of the subset of characteristics associated with the selected stream to generate the one or more packets. This has been already explained in reference to FIGS. 3A-3B. Once the one or more packets are generated, at step 504, the respective DUT input generator may send the one or more packets generated to a DUT input driver. In reference to FIG. 1, the DUT input driver may correspond to the DUT input driver 112. Upon receiving the one or more packets generated from the respective DUT input generator, the DUT input driver may inject the one or more packets generated into the DUT.

Figure 6:
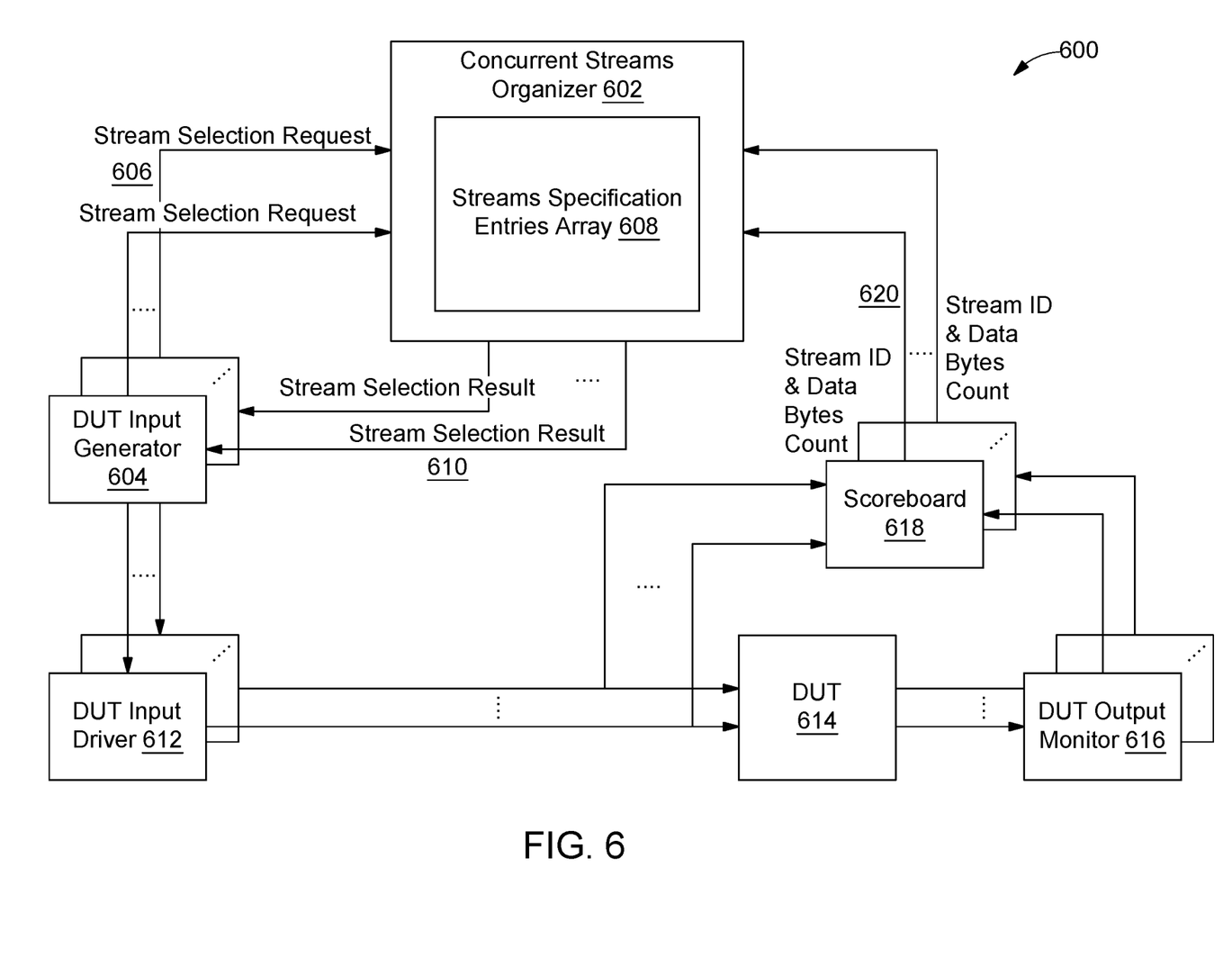
FIG. 6 illustrates a functional diagram of a system configured for off-loading streams selection to generate organized concurrent streams in a simulation environment consisting of multiple DUT input generators, in accordance with an embodiment.

Referring now to FIG. 6, a functional diagram of a system 600 configured for off-loading streams selection to generate organized concurrent streams in a simulation environment consisting of multiple DUT input generators is illustrated, in accordance with an embodiment. As will be appreciated, system and method performed for off-loading stream selection to generate organized concurrent streams in the simulation environment for one DUT has been already explained in reference to FIG. 1 and FIG. 5 respectively. Moreover, in present FIG. 6, similar process is followed by the system 600 for generating organized concurrent streams in the simulation environment for multiple DUT input generators. The system 600 may include a concurrent streams organizer 602. The concurrent streams organizer 602 may be configured to receive at least one stream selection request 606 from each of a set of DUT input generators 604 available in the simulation environment (also referred as a test environment). In an embodiment, the at least one stream selection request 606 may be received from each of a set DUT input generators 604.

Upon receiving the at least one stream selection request 606, the concurrent streams organizer 602 may be configured to perform a stream selection process. In an embodiment, the stream selection process may be performed based on one of the input stream rate and the output stream rate associated with the stream. Moreover, the stream selection process may be performed in at least one of the normal selection mode and the expected output-based selection mode. In one embodiment, in order to perform the stream selection process using the normal selection, the concurrent streams organizer 602 may analyze each of a plurality of stream specification entries of a stream specification entries array 608.

Further, for each of the plurality of stream specification entries, the concurrent streams organizer 602 may calculate an incremental credit value based on the input stream rate and a difference between the current time and the entry last updated time. Once the incremental credit value is calculated, the concurrent streams organizer 602 may add the incremental credit value and an accumulated credit value. The concurrent streams organizer 602 may then write result of the addition back to the accumulated credit field. The result may depict a real value for a number of bytes accumulated. In reference to FIG. 2A, fourteenth row of the stream specification entry 202A may depict the accumulated credit field.

Once the analysis is completed, then in order to perform selection of the stream, the concurrent streams organizer 602 may be configured to identify one or more streams that may fulfill a predefined condition. In an embodiment, the predefined condition may include a set of parameters, such as, each of the one or more streams is enabled, i.e., stream enable=='1', input packet size is less than or equals the accumulated credit, and packets count is less than total number of packets specification. It should be noted that, the input packet size may be chosen based on input packet size specification. In an embodiment, upon identifying that none of the streams are available that fulfills the predefined condition, then the concurrent streams organizer 602 may wait for a specified amount of time. After waiting for the specified amount of time, the concurrent streams organizer 602 may again perform a check to identify if at least one stream that fulfills the predefined condition is available or not. In an embodiment, process of identifying the at least one stream that fulfills the predefined condition may be reiterated until the at least one stream is identified.

Further, based on the check performed, in first case, when the concurrent streams organizer 602 identifies that only one stream is available, then that stream becomes the selected stream. In addition, based on the check performed, in second case, when one or more streams are available that fulfill the predefined condition, then the concurrent streams organizer 602 may select a stream from the one or more streams based on one of a plurality of criteria. The plurality of criteria may include selection of the stream with highest accumulated credit value, selection of stream with highest input stream rate, random selection of the stream, and selection of stream based on user specification. In an embodiment, if there are more than one stream available with the highest accumulated credit value, then the stream with the highest input stream rate may be selected from them.

Further, if there are more than one stream available with the highest input stream rate, then the stream with the highest accumulated credit value may be selected from them. Moreover, for the selected stream, the concurrent streams organizer 602 may subtract the input packet size from the accumulated credit value of the stream. Further, the concurrent streams organizer 602 may write result after performing subtraction in the accumulated credit field of the selected stream.

In one embodiment, in order to perform the stream selection process using the expected output-based selection mode, the concurrent streams organizer 602 may analyze each of the plurality of stream specification entries of the stream specification entries array 608. Further, for each of the plurality of stream specification entries using the expected output-based selection mode, the concurrent streams organizer 602 may calculate an incremental credit value based on the output stream rate and a difference between the current time and the entry last updated time. Once the incremental credit value is calculated, the concurrent streams organizer 602 may add the increment credit value with an accumulated credit value of each of the plurality of streams using the expected output-based selection mode. The concurrent streams organizer 602 may then write result of the addition back to the accumulated credit field of each of the plurality of streams using the expected output-based selection mode. The result may depict a real value for a number of bytes accumulated. In reference to FIG. 2A, fourteenth row of the stream specification entry may depict the accumulated credit field.

Once the analysis is completed, then in order to perform selection of the stream, the concurrent streams organizer 602 may be configured to identify one or more streams that may fulfill a predefined condition. In an embodiment, the predefined condition may include a set of parameters, such as, each of the one or more streams is enabled, i.e., stream enable=output packet size is less than or equals the accumulated credit, and packets count is less than total number of packets specification. It should be noted that, the output packet size may be chosen based on output packet size specification, i.e., maximum possible size. In an embodiment, upon identifying that none of the plurality of streams are available that fulfills the predefined condition, then the concurrent streams organizer 602 may wait for a specified amount of time. After waiting for the specified amount of time, the concurrent streams organizer 602 may again perform the check to identify if at least one stream that fulfills the predefined condition is available or not. In an embodiment, the concurrent streams organizer 602 may reiterate this process of identifying the at least one stream that fulfills the predefined condition until the at least one stream is identified.

Further, based on the check performed, in first case, when the concurrent streams organizer 602 may identify that only one stream from the plurality of streams that fulfills the predefined condition is available, then that particular stream becomes the selected stream. In addition, based on the check performed, in second case, when one or more streams are available that fulfill the predefined condition, then the concurrent streams organizer 602 may select a stream from the one or more streams based on using one of a plurality of criteria. The plurality of criteria may include selection of the stream with highest accumulated credit value, selection of stream with highest output stream rate, random selection of the stream, and selection of the stream based on user specification.

In an embodiment, if there are more than one stream available with the highest accumulated credit value, then the stream with the highest output stream rate may be selected from them. Further, if there are more than one stream available with the highest output stream rate, then the stream with the highest accumulated credit value may be selected from them. Moreover, in both modes, i.e., the normal selection mode and the expected output-based selection mode the concurrent streams organizer 602 may determine additional parameters for the selected stream using specifications available in the stream specification entry associated with the selected stream. In reference to FIG. 2A, the additional parameters may correspond to one or more of the set of stream specification entry fields in the stream specification entry 202A.

Once the selection of the stream is performed, the concurrent streams organizer 602 may generate a stream selection result object 610 based on each of the selected stream. The stream selection result object 610 generated may include a subset of characteristics corresponding to a subset of stream specification entries of each of the selected stream. The subset of characteristics of the selected stream may include, but is not limited to, a Stream ID (Stream Identifier), a Sub-Stream ID, an Input Packet Size, a Packet Type, a Packet Number, a Sync Packet, and an Inject Error.

Once the stream selection result object 610 is generated, the concurrent streams organizer 602 may send each of the stream selection result object 610 associated with each of the selected stream to each of the respective DUT input generator, i.e., each of the set of DUT input generators 604. Upon receiving the stream selection result object 610, each of the set of DUT input generators 604 may utilize the one or more of the set of stream specification entry fields of the associated stream selection result object 610 to send one or more packets to the DUT 614. In an embodiment, the set of DUT input generators 604 may generate the one or more packets based on the subset of characteristics of each of the associated selected stream. In order to send the one or more packets to the DUT 614, initially, each of the DUT input generators 604 may send the one or more packets generated to an associated DUT input driver 612.

Upon receiving the one or more packets, the associated DUT input driver 612 may inject the one or more packets into the DUT 614. Moreover, a respective DUT output monitor 616 may be configured to monitor an output interface of the DUT 614. The information associated with the stream selection result object 610 may include stream identification (ID) 620 of each of the selected stream. Moreover, the DUT output monitor 616 may provide information associated with one or more output packets at the output interface of the DUT 114 to the scoreboard 618. It should be noted that, the one or more output packets may be different than the one or more packets injected by the associated DUT input driver 612 into the DUT 614.

Further, the scoreboard 618 may send the Stream ID and Data Bytes Count 620 associated with each of the expected DUT 614 output packets to the concurrent streams organizer 602. The concurrent streams organizer 602 may then update each of the stream specification entries array based on the information received for each of the selected stream. In an embodiment, the updated stream specification entries array may be used for performing subsequent stream selection for each of the set of DUT input generators 604 based on a subsequent request received from each of the set of DUT input generators 604.

As will be appreciated, the concurrent streams organizer 602 may be configured to maintain one streams specification entries array for the DUT 614. Further, the concurrent streams organizer 602 may perform the stream selection process using the stream specification entries array 608 associated with each of the set of DUT input generators 604 available in the simulation environment and return the stream selection result object 610 to each of the respective DUT input generators 604 (e.g., UVM Sequence) present in the simulation environment based on the at least one request received from each of the set of DUT input generators 604.

Various embodiments provide method and system for off-loading streams selection to generate organized concurrent streams in a simulation environment. The disclosed method and system may receive from at least one Device Under Test (DUT) input generator, at least one stream selection request for a DUT. Further, the disclosed method and system may perform a stream selection process in response to receiving the request. In order to perform the stream selection process, the disclosed method and system may analyze each of a plurality of stream specification entries of a stream specification entries array. Each of the plurality of stream specification entries may include a set of stream specification entry fields associated with each of a plurality of streams. Further, the disclosed method and system may select a stream from the plurality of streams based on one or more of the set of stream specification entry fields associated with the stream. Thereafter, the disclosed method and system may generate a stream selection result object based on the selected stream. The stream selection result object may include a subset of characteristics corresponding to a subset of stream specification entry fields of the selected stream. Once the stream selection process is completed, the disclosed method and system may send the stream selection result object associated with the selected stream to the respective DUT input generator. Thereafter, the disclosed method and system may enable utilization of the stream selection result object associated with the selected stream by the respective DUT input generator, to send one or more packets to the DUT for the selected stream.

The disclosed method and system may provide some advantages like, the disclosed method and the system may be methodology independent and hence may be used across any of an existing industry standard verification methodology. Further, the disclosed method and the system may provide a unique method of organizing and generating multiple streams concurrently by offloading streams information processing and stream selection to a standalone module (i.e., the concurrent streams organizer) during process of Device Under Test (DUT) or System Under Test (SUT) input generation. Further, the disclosed method and the system may provide an ability to perform stream selection for each DUT/SUT input generator when there are multiple DUT/SUT input generators available in the simulation environment (also referred as test environment) for multiple DUT/SUT input interfaces. In addition, the disclosed method and the system may provide an ability to perform stream selection based on expected output prediction. This may be useful when focus is on the output. Moreover, the disclosed method and the system may enable a user (e.g., a tester) to stop and re-start a stream when needed, as per his requirements.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A computer-implemented hardware method for offloading streams selection to generate organized concurrent streams in a simulation environment, the computer-implemented hardware method comprising:
receiving, by a concurrent streams organizer from at least one Device Under Test (DUT) input generator, at least one stream selection request for a DUT;
performing, by the concurrent streams organizer, a stream selection process in response to receiving the at least one stream selection request, wherein performing the stream selection process comprises:
analyzing each of a plurality of stream specification entries of a stream specification entries array, wherein each of the plurality of stream specification entries comprises a set of stream specification entry fields associated with each of a plurality of streams;
selecting a stream from the plurality of streams based on one or more of the set of stream specification entry fields associated with the stream; and
generating a stream selection result object based on the selected stream, wherein the stream selection result object comprises a subset of characteristics corresponding to a subset of stream specification entry fields of the selected stream;
sending, by the concurrent streams organizer, the stream selection result object associated with the selected stream to a respective DUT input generator from the at least one DUT input generator in response to receiving the at least one stream selection request; and
utilizing, by the respective DUT input generator, the stream selection result object associated with the selected stream to send one or more packets to the DUT for the selected stream.

2. The computer-implemented hardware method of claim 1, further comprising:
maintaining, by the concurrent streams organizer, the set of stream specification entry fields associated with each of the plurality of streams in the stream specification entries array for the DUT, wherein for the DUT, a plurality of DUT input generators are available in the simulation environment.

3. The computer-implemented hardware method of claim 1, wherein each of the set of stream specification entry fields specifies a characteristic associated with each of the plurality of streams represented in a plurality of stream specification entries array.

4. The computer-implemented hardware method of claim 1, wherein selecting the stream comprises performing, by the concurrent streams organizer, a set of functionalities based on the at least one stream selection request received to provide the stream selection result object to the respective DUT input generator.

5. The computer-implemented hardware method of claim 4, wherein the selection of the stream is based on one of an input stream rate and an output stream rate associated with the stream through at least one of a normal selection mode and an expected output-based selection mode.

6. The computer-implemented hardware method of claim 1, wherein the subset of characteristics associated with selected stream includes a Stream ID (Stream Identifier), a Sub-Stream ID, an Input Packet Size, a Packet Type, a Packet Number, a Sync Packet, and an Inject Error.

7. The computer-implemented hardware method of claim 6, further comprising:
utilizing, by the respective DUT input generator, each of the subset of characteristics associated with the selected stream to generate the one or more packets; and
sending, by the respective DUT input generator, the one or more packets to a DUT input driver for injecting the one or more packets in to the DUT.

8. The computer-implemented hardware method of claim 1, further comprises:
updating, by the concurrent streams organizer, the stream specification entries array based on the at least one stream selection request from the at least one DUT input generator, wherein the updated stream specification entries array is used for performing subsequent stream selection for the at least one DUT input generator based on the at least one stream selection request received from the at least one DUT input generator.

9. A system for off-loading streams selection to generate organized concurrent streams in a simulation environment, the system comprising:
 a processor; and
 a non-transitory computer-readable medium coupled to the processor, wherein the non-transitory computer-readable medium stores processor executable instructions, which, on execution, causes the processor to:
  receive from at least one Device Under Test (DUT) input generator, at least one stream selection request for a DUT;
  perform a stream selection process in response to receiving the at least one stream selection request, wherein performing the stream selection process comprises:
   analyze each of a plurality of stream specification entries of a stream specification entries array, wherein each of the plurality of stream specification entries comprises a set of stream specification entry fields associated with each of a plurality of streams;
   select a stream from the plurality of streams based on one or more of the set of stream specification entry fields associated with the stream; and
   generate a stream selection result object based on the selected stream, wherein the stream selection result object comprises a subset of characteristics corresponding to a subset of stream specification entry fields of the selected stream;
  send the stream selection result object associated with the selected stream to a respective DUT input generator from the at least one DUT input generator in response to receiving the at least one stream selection request; and
  utilize, by the respective DUT input generator, the stream selection result object associated with the selected stream to send one or more packets to the DUT for the selected stream.

10. The system of claim 9, wherein the processor executable instructions further cause the processor to:
 maintain the set of stream specification entry fields associated with each of the plurality of streams in the stream specification entries array for the DUT, wherein for the DUT, a plurality of DUT input generators are available in the simulation environment.

11. The system of claim 9, wherein each of the set of stream specification entry fields specifies a characteristic associated with each of the plurality of streams represented in a plurality of stream specification entries array.

12. The system of claim 9, wherein, to select the stream, the processor executable instructions further cause the processor to:
 perform a set of functionalities based on the at least one stream selection request received to provide the stream selection result object to the respective DUT input generator.

13. The system of claim 12, wherein the selection of the stream is based on one of an input stream rate and an output stream rate associated with the stream through at least one of a normal selection mode and an expected output-based selection mode.

14. The system of claim 9, wherein the subset of characteristics associated with selected stream includes a Stream ID (Stream Identifier), a Sub-Stream ID, an Input Packet Size, a Packet Type, a Packet Number, a Sync Packet, and an Inject Error.

15. The system of claim 14, wherein the processor executable instructions further cause the processor to:
 utilize, by the respective DUT input generator, each of the subset of characteristics associated with the selected stream to generate the one or more packets; and
 send, by the respective DUT input generator, the one or more packets to a DUT input driver for injecting the one or more packets in to the DUT.

16. The system of claim 9, wherein the processor executable instructions further cause the processor to:
 update the stream specification entries array based on the at least one stream selection request from the at least one DUT input generator, wherein the updated stream specification entries array is used for performing subsequent stream selection for the at least one DUT input generator based on the at least one stream selection request received from the at least one DUT input generator.

17. A non-transitory computer-readable medium storing computer-executable instructions for off-loading streams selection to generate organized concurrent streams in a simulation environment, the stored instructions, when executed by a processor, cause the processor to perform operations comprises:
 receiving, from at least one Device Under Test (DUT) input generator, at least one stream selection request for a DUT;
 performing a stream selection process in response to receiving the at least one stream selection request, wherein performing the stream selection process comprises:
  analyzing each of a plurality of stream specification entries of a stream specification entries array, wherein each of the plurality of stream specification entries comprises a set of stream specification entry fields associated with each of a plurality of streams;
  selecting a stream from the plurality of streams based on one or more of the set of stream specification entry fields associated with the stream; and
  generating a stream selection result object based on the selected stream, wherein the stream selection result object comprises a subset of characteristics corresponding to a subset of stream specification entry fields of the selected stream;
 sending, by a concurrent streams organizer, the stream selection result object associated with the selected stream to a respective DUT input generator from the at least one DUT input generator in response to receiving the at least one stream selection request; and
 utilizing, by the respective DUT input generator, the stream selection result object associated with the selected stream to send one or more packets to the DUT for the selected stream.

* * * * *